United States Patent [19]
Onishi et al.

[11] Patent Number: 5,740,297
[45] Date of Patent: Apr. 14, 1998

[54] DISPERSION-COMPENSATING FIBER AND METHOD OF FABRICATING THE SAME

[75] Inventors: Masashi Onishi; Chie Fukuda; Hiroo Kanamori, all of Yokohama, Japan

[73] Assignee: Sumitomo Electric Industries, Ltd., Osaka, Japan

[21] Appl. No.: 705,993

[22] Filed: Aug. 30, 1996

[30] Foreign Application Priority Data

Aug. 31, 1995 [JP] Japan .................................. 7-223605

[51] Int. Cl.$^6$ .................................................. G02B 6/22
[52] U.S. Cl. .......................... 385/127; 385/142; 385/144
[58] Field of Search .................................. 385/123, 127, 385/126, 141, 142, 143, 144, 145, 146

[56] References Cited

U.S. PATENT DOCUMENTS

| | | | |
|---|---|---|---|
| 4,123,242 | 10/1978 | Imoto et al. | 65/11 |
| 4,923,279 | 5/1990 | Ainslie et al. | 350/96.3 |
| 4,974,932 | 12/1990 | Nattermann et al. | 350/96.33 |
| 5,106,402 | 4/1992 | Geittner et al. | 385/127 |
| 5,448,674 | 9/1995 | Vengsarkar et al. | 385/123 |

FOREIGN PATENT DOCUMENTS 7-261048  10/1995  Japan .

*Primary Examiner*—John Ngo
*Attorney, Agent, or Firm*—Cushman Darby & Cushman IP Group of Pillsbury Madison & Sutro LLP

[57] ABSTRACT

This invention relates to a dispersion-compensating fiber which can be drawn at a lower temperature and can further reduce optical transmission loss. This dispersion-compensating fiber comprises a core portion containing a high concentration of $GeO_2$ and a cladding portion formed around the outer periphery of the core portion. The cladding portion comprises a first cladding containing fluorine or the like as an index reducer, a second cladding having a higher refractive index than that of the first cladding, and a third cladding which becomes a glass region substantially non-contributory to propagation of signal light. In particular, the third cladding contains a desired impurity such that the glass viscosity thereof becomes lower than that of the second cladding or pure silica cladding at a predetermined temperature.

26 Claims, 15 Drawing Sheets

| | CORE (μm) | FIRST CLADDING (μm) | SECOND CLADDING (μm) $1-P_{0-a}=10^{-50}$ | SECOND CLADDING (μm) $1-P_{0-a}=10^{-40}$ | SECOND CLADDING (μm) $1-P_{0-a}=10^{-30}$ | DISPERSION SLOPE ps/Km/nm² | DISPERSION VALUE ps/Km/nm | MFD (μm) |
|---|---|---|---|---|---|---|---|---|
| No.1 | 2.3 | 6.6 | 36 | 32 | 28 | -0.33 | -178 | 4.8 |
| No.2 | 2.4 | 6.9 | 33 | 30 | 26 | -0.25 | -147 | 4.4 |
| No.3 | 2.5 | 7.1 | 31 | 28 | 24 | -0.16 | -122 | 4.2 |
| No.4 | 2.6 | 7.4 | 30 | 27 | 24 | -0.13 | -103 | 4.0 |
| No.5 | 2.7 | 7.7 | 30 | 27 | 23 | -0.10 | -88 | 3.9 |
| No.6 | 2.8 | 8.0 | 29 | 26 | 23 | -0.07 | -75 | 3.8 |

Fig. 7

$\Delta+=2.1\%$

| | CORE ($\mu m$) | FIRST CLADDING ($\mu m$) | SECOND CLADDING ($\mu m$) $1-P_{0-a}=10^{-50}$ | SECOND CLADDING ($\mu m$) $1-P_{0-a}=10^{-40}$ | SECOND CLADDING ($\mu m$) $1-P_{0-a}=10^{-30}$ | DISPERSION SLOPE ps/Km/nm² | DISPERSION VALUE ps/Km/nm | MFD ($\mu m$) |
|---|---|---|---|---|---|---|---|---|
| No.1 | 2.6 | 7.4 | 37 | 33 | 29 | -0.54 | -155 | 4.9 |
| No.2 | 2.7 | 7.7 | 35 | 31 | 27 | -0.33 | -120 | 4.6 |
| No.3 | 2.8 | 8.0 | 33 | 30 | 26 | -0.21 | -96 | 4.4 |
| No.4 | 2.9 | 8.3 | 32 | 29 | 25 | -0.14 | -80 | 4.3 |
| No.5 | 3.0 | 8.6 | 32 | 28 | 25 | -0.09 | -67 | 4.2 |
| No.6 | 3.1 | 8.9 | 31 | 28 | 24 | -0.06 | -57 | 4.1 |
| No.7 | 3.2 | 9.1 | 31 | 28 | 24 | -0.04 | -48 | 4.1 |

DISPERSION-COMPENSATING FIBER AND METHOD OF FABRICATING THE SAME

BACKGROUND OF THE INVENTION

1. Field of the Invention

The present invention relates to a dispersion-compensating fiber which is applicable to an optical transmission system including an optical fiber designed such that zero-dispersion wavelength lies within 1.3-μm wavelength band and which compensates the dispersion and wavelength dependency of the system with respect to light of 1.5-μm wavelength band.

2. Related Background Art

In a optical transmission system including an optical fiber designed such that zero-dispersion wavelength lies within 1.3-μm wavelength band, as a dispersion-compensating fiber for compensating for the dispersion and wavelength dependency of the system with respect to light of 1.5-μm wavelength band, there has conventionally been known, for example, a dispersion-compensating fiber having a refractive index profile shown in FIG. 1 (Japanese Laid-open Patent Application No. 7-261048). This dispersion-compensating fiber is mainly composed of silica glass (referred to as "$SiO_2$ glass" hereinafter) and constituted by a core 100 containing a high concentration of $GEO_2$; a fluorine-doped first cladding 200 which is formed around the outer periphery of the core 100 in close contact therewith; and a second cladding 300 which is a pure silica glass region formed around the outer periphery of the first cladding 200 in close contact therewith.

Here, though in different scales, the respective horizontal axes of the light intensity distribution and refractive index profile of the dispersion-compensating fiber shown in FIG. 1 denote the positions on a cross section along a line L2 in the drawing which is perpendicular to the center axis of the core 100. Accordingly, in the refractive index profile, regions 101, 201, and 301 respectively correspond to the region of the core 100 on the line L2, the region of the first cladding 200 on the line L2, and the region of the second cladding 300 on the line L2.

In the conventional dispersion-compensating fiber, the respective refractive indices of the core 100, first cladding 200, and second cladding 300 are restricted to specific ranges shown in FIG. 1, thereby attaining a negative dispersion value with respect to light near a wavelength of 1.5 μm and setting a negative dispersion slope.

SUMMARY OF THE INVENTION

In general, a dispersion-compensating fiber comprises a core containing a high concentration of $GeO_2$ so as to increase its refractive index, and a cladding containing a predetermined concentration of fluorine so as to reduce its refractive index, the cladding being formed around the outer periphery of the core in close contact therewith. Thus, the refractive indices of these regions are individually set so as to relatively increase the difference in refractive index between the core and the cladding in order to obtain a larger dispersion value. In the dispersion-compensating fiber of FIG. 1, for example, the dispersion value with respect to a predetermined wavelength is dependent on the depth of a depression region A in the refractive index profile shown in FIG. 1.

On the other hand, when $GeO_2$ is added to a core of a fiber preform in a concentration as high as about 10 mol % to 30 mol %, it is desirable that the fiber preform be drawn at a lower temperature than that for a common optical fiber (containing $GeO_2$ of not greater than 5 mol %), in the drawing step for fabricating the fiber. This is due to the fact that, when the drawing is performed at a temperature higher than the above-mentioned temperature, optical transmission loss of the obtained fiber increases with increasing concentration of $GeO_2$ dopant.

Here, since the second cladding (outermost region) of the above-mentioned conventional dispersion-compensating fiber is pure silica glass, it usually has to be drawn at a temperature as high as 1,950° C. to 2,000° C. It means that the fiber preform must be drawn at a high temperature even at the risk of increasing the loss in optical transmission in the core to a certain extent, thereby yielding a large obstacle to further reduction of optical transmission loss. In the specification, pure silica glass means pure glassy $SiO_2$. However, these concrete temperatures are relative values and described by the Applicants just as a reference because these drawing temperatures can respectively present different values, based on a measurement position, a measurement method, or the like.

In view of the foregoing circumstances, one object of the present invention is to provide a dispersion-compensating fiber which can further reduce optical transmission loss as compared with the conventional fiber.

The dispersion-compensating fiber according to the present invention is, for example as shown in FIG. 2, an optical waveguide mainly composed of silica glass and comprises a core portion 1 containing at least 10 mol % of $GeO_2$, and a cladding portion which is formed around the outer periphery of the core portion 1 and whose refractive index is set lower than that of the core portion 1. This cladding portion comprises a first cladding 2 formed around the outer periphery of the core portion 1 in close contact therewith, a second cladding 3 formed around the outer periphery of the first cladding 2 in close contact therewith, and a third cladding 4 formed around the outer periphery of the second cladding 3 in close contact therewith. In particular, the third cladding 4 is a glass region containing an impurity for controlling glass viscosity at a predetermined temperature (e.g., temperature at the time of drawing). Specific examples of impurities for controlling glass viscosity include fluorine (F), chlorine (Cl), germanium (Ge), phosphorus (P), boron (B), or the like. FIG. 3 shows the relationship between dopant addition of typical impurities and their resulting glass viscosity at 1,500° C.

Here, in the dispersion-compensating fiber, a predetermined amount of impurity for reducing refractive index such as fluorine or boron is added, at least, to the first cladding 2 so as to set the respective refractive indices of the core portion 1 and first cladding 2 such that the difference in refractive index between these glass regions is relatively increased. Thus, as the concentration of the doped impurity is controlled (see FIG. 4) so as to set a sufficient difference in refractive index between the core portion 1 and the first cladding 2, the dispersion value of the dispersion-compensating fiber can be set negative while the dispersion slope can be set negative. Also, this dispersion-compensating fiber is an optical waveguide satisfying a predetermined single-mode condition, in which the outer diameter of the core portion 1 and the outer diameter of the first cladding 2 are respectively set to 2 to 4 μm and 4 to 20 μm.

In such a single-mode dispersion-compensating fiber, light traveling therethrough also spreads over a glass region (a part of the cladding portion) near the core portion 1. Since such spread of light over the fiber diameter direction (direction perpendicular to the traveling direction of light) decreases exponentially, there is a region in the outer periphery of the cladding portion where light is hardly propagated therethrough. The cladding located at such a region is also known as physical cladding or jacket layer, since it is mainly a glass region for securing physical strength. The third cladding 4 corresponds to the physical cladding. On the other hand, the glass region which is located inside of the physical cladding and through which light travels is also known as optical cladding. The first and second claddings 2 and 3 correspond to the optical cladding.

In the dispersion-compensating fiber according to the present invention, as mentioned above, an impurity for controlling glass viscosity such as fluorine or chlorine is added to the third cladding 4, which corresponds to a physical cladding substantially noncontributory to traveling of optical signals, thereby controlling the glass viscosity of the third cladding 4 at a predetermined temperature at the time of drawing. As the third cladding 4 whose glass viscosity at a predetermined temperature has been controlled is formed as a physical cladding, the ratio of the optical cladding having a high glass viscosity at the predetermined temperature in the whole cross-sectional area (area of a plane perpendicular to the light traveling direction) decreases. Accordingly, when drawing is performed, drawing can be performed at a lower temperature.

Specifically, the dispersion-compensating fiber according to the present invention comprises the core portion 1 containing about 10 mol % to 30 mol % of $GeO_2$ and having an outer diameter of 2 to 4 μm. The cladding portion formed around the outer periphery of the core portion 1 comprises the first cladding 2 (constituting a part of the optical cladding) which is a glass region doped with fluorine or the like as an index reducer for reducing the refractive index thereof and having an outer diameter of 4 to 20 μm; the second cladding 3 (constituting the optical cladding together with the first cladding 2) formed around the outer periphery of the first cladding 2 in close contact therewith; and the third cladding 4 (constituting the physical cladding) which is formed around the outer periphery of the second cladding 3 in close contact therewith as a glass region having a glass viscosity lower than that of the second cladding at the time of drawing and having an outer diameter of 80 to 150 μm. In particular, in the dispersion-compensating fiber, the difference in refractive index between the first cladding 2 and the second cladding 3 is controlled by adjusting amount of fluorine or the like added to the first cladding 2 is controlled, without the refractive index of the second cladding 3 being controlled. Also, glass viscosity control of the dispersion-compensating fiber is performed at the third cladding 4 such that the glass viscosity of the third cladding 4 at a predetermined temperature is lower than that of the second cladding 3.

The inventors have confirmed that a desired optical waveguide product can be obtained when the third cladding 4 contains 1 wt % to 2 wt % of fluorine or 0.25 wt % to 1 wt % of chlorine.

Further, it is preferable that the second cladding 3 is doped with an impurity for controlling glass viscosity thereof. Specifically, the cladding portion of the dispersion-compensating fiber comprises the first cladding 2 (constituting a part of the optical cladding) which is a glass region having an outer diameter of 4 to 20 μm and is doped with fluorine or the like so as to control the refractive index thereof; the second cladding 3 (constituting the optical cladding together with the first cladding 2) which is formed around the first cladding 2 in close contact therewith and has a glass viscosity lower than that of pure silica glass (pure glassy $SiO_2$) at a predetermined temperature; and the third cladding 4 (constituting the physical cladding) which is formed around the second cladding 3 in close contact therewith as a glass region having a glass viscosity lower than that of pure silica glass at a predetermined temperature and having an outer diameter of 80 to 150 μm.

Consequently, the dispersion-compensating fiber may be characterized in that the second cladding 3 is also doped with an impurity for reducing the glass viscosity of the second cladding 3 at a predetermined temperature (e.g., temperature at the time of drawing). This feature is adopted in view of the fact that, in the case where the second cladding 3 is pure silica glass, a change in refractive index of this glass region (decrease in refractive index due to residual stress) occurs when drawing tension concentrates too much on the second cladding 3 which has a glass viscosity higher than that of the third cladding 4.

Preferably, in this case, the impurity contained in the second cladding 3 is a material such as chlorine or the like which increases refractive index of the third cladding. When the refractive index of the first cladding 2 is reduced while that of the second cladding 3 is increased so as to control the difference in refractive index between the first and second claddings 2 and 3, the depression region A (region defined by the respective refractive index profiles of the region 10 corresponding to the core portion 1, the region 20 corresponding to the first cladding 2, and the region 30 corresponding to the second cladding 3) can be made deeper. Also, when the refractive index profile is controlled in this manner, the dispersion characteristic of the dispersion-compensating fiber can be further improved (a sufficient negative dispersion value is obtained while the absolute value of dispersion slope is increased).

In this dispersion-compensating fiber, the control of difference in refractive index between the first cladding 2 and the second cladding 3 (control of depth of the depression region A in the refractive index profile of FIG. 2) is performed by adjusting the amount of fluorine or the like as an index reducer for the first cladding 2 and the amount of chlorine or the like added to the second cladding 3. Though technical difficulty generally becomes greater as the amount of dopant such as fluorine increases, a sufficient difference in refractive index (for obtaining a large dispersion value) can be easily obtained between the first and second claddings 2 and 3 when the second cladding 3 is doped with a predetermined amount chlorine or the like so as to increase the refractive index thereof. Also, glass viscosity control of this dispersion-compensating fiber is performed to the second and third claddings 2 and 3 such that the glass viscosity of each of the second and third claddings 3 and 4 at a predetermined temperature is lower than that of pure silica glass. Namely, the second cladding 3 contains 0.25 wt % to 1 wt % of chlorine, thereby realizing both refractive index control and glass viscosity control. Also, in the dispersion-compensating fiber having the above structure, the inventors have confirmed that a desired optical waveguide product can be obtained when the third cladding contains 0.1 wt % to 2 wt % of fluorine or 0.25 wt % to 1 wt % of chlorine.

Here, as the impurity for controlling glass viscosity of the third cladding 4, an impurity identical to the impurity added to the second cladding 3 such as chlorine for increasing refractive index while reducing glass viscosity at a predetermined temperature may be selected, and thus selected identical impurity may be added to the third cladding 4 with an amount of dopant similar to that added to the second cladding 3, whereby the fabricating process can be simplified.

Also, desirably in the dispersion-compensating fiber according to the present invention, a fiber preform which has been prepared beforehand is drawn with a tension of 5 to 16 kg/mm². In this case, a dispersion-compensating fiber having a low optical transmission loss, which overcomes the above-mentioned problem, is obtained.

Also, desirably in practice, the dispersion-compensating fiber according to the present invention has a low optical transmission loss of 1 dB/km or lower with respect to light of 1.55-µm wavelength band.

Further, when the dispersion-compensating fiber according to the present invention has a dispersion value set to −50 ps/km/nm or lower and a dispersion slope set negative with respect to light of 1.55-µm wavelength band, it can effectively compensate for the dispersion and wavelength dependency of the optical transmission system including an optical fiber designed such that zero-dispersion wavelength lies within 1.3-µm wavelength band fiber.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 6 is a chart showing configurations and various characteristics of dispersion-compensating fiber samples (in the case where $\Delta^+=2.5\%$);

FIG. 7 is a chart showing configurations and various characteristics of dispersion-compensating fiber samples (in the case where $\Delta^+=2.1\%$);

DESCRIPTION OF THE PREFERRED EMBODIMENTS

In the following, individual embodiments of the dispersion-compensating fiber according to the present invention will be explained with reference to FIGS. 2 to 19.

Figure 1:
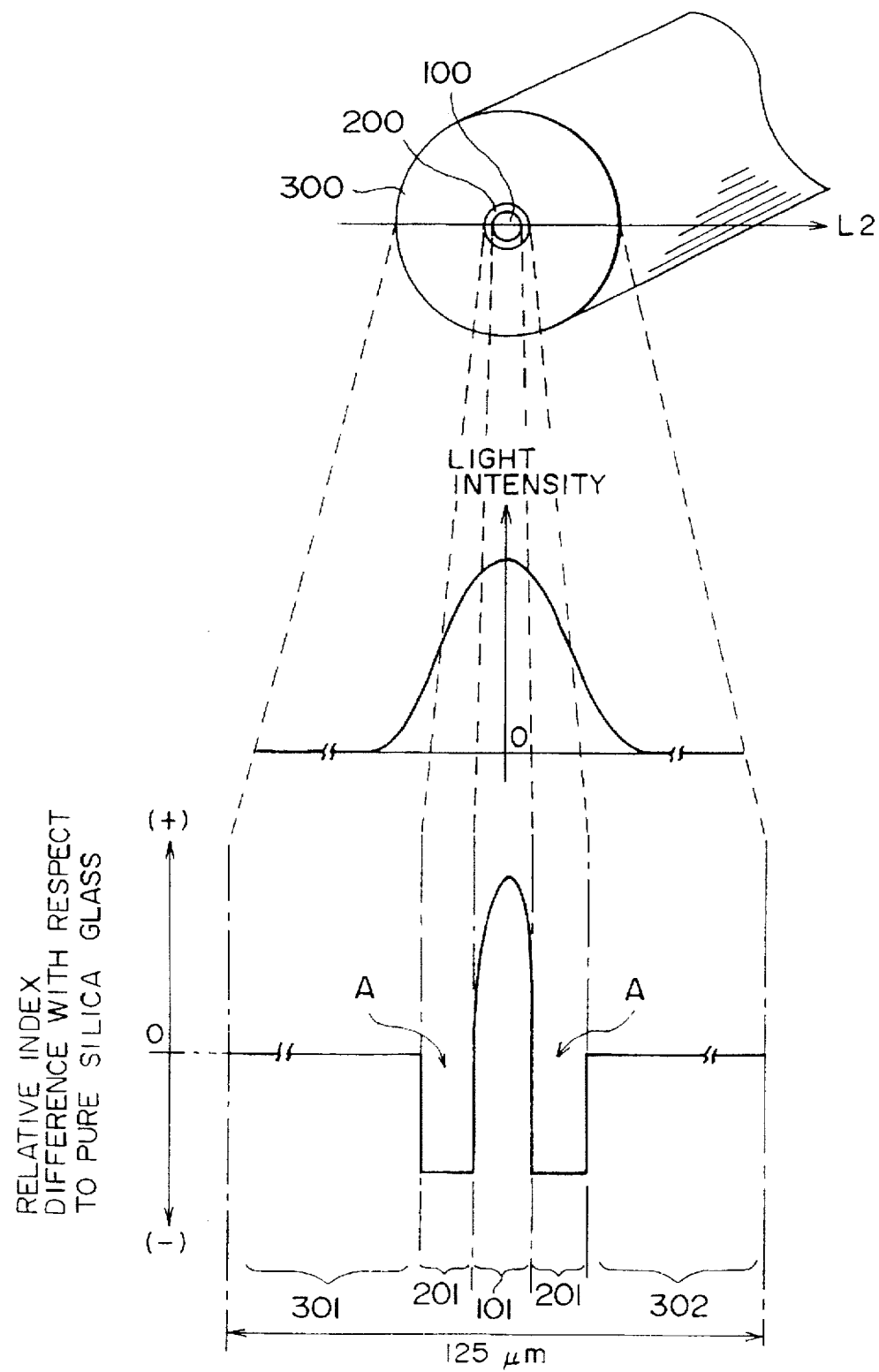
FIG. 1 is a view showing a cross-sectional structure of a conventional dispersion-compensating fiber and a refractive index profile corresponding thereto.
Figure 2:
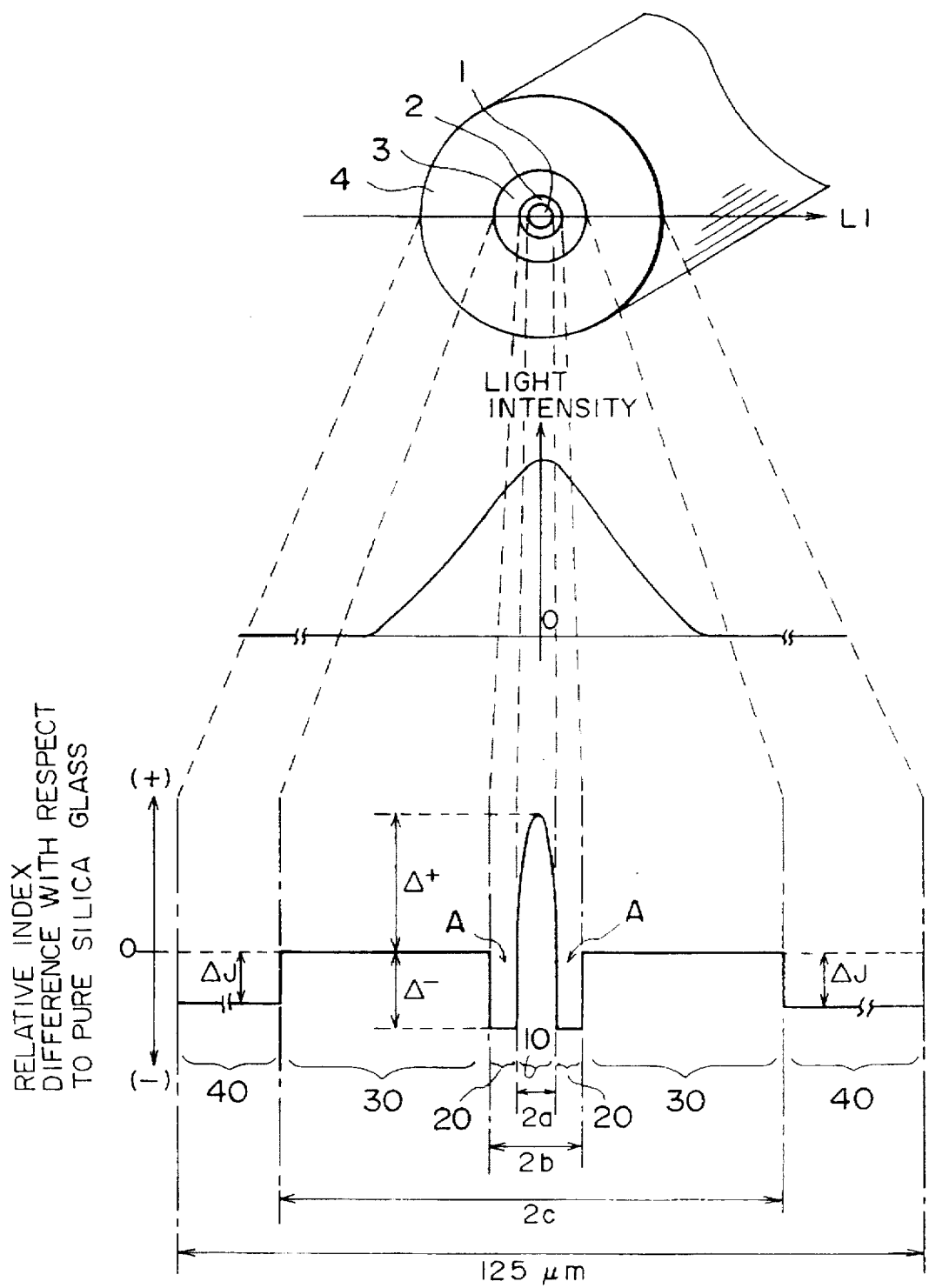
FIG. 2 is a view showing a cross-sectional structure of the dispersion-compensating fiber according to the present invention, a light intensity distribution corresponding thereto, and a refractive index profile corresponding thereto.

FIG. 2 is a view showing a cross-sectional structure of the dispersion-compensating fiber according to the present invention, its light intensity distribution in the fiber diameter direction (direction indicated by a line L1), and its refractive index profile in the fiber diameter direction. Here, though in different scales, the respective horizontal axes of the light intensity distribution and refractive index profile of the dispersion-compensating fiber shown in FIG. 2 denote the positions on a cross section along the line L1 in the drawing which is perpendicular to the center axis of a core portion 1.

Accordingly, in the refractive index profile, regions 10, 20, 30, and 40 respectively correspond to the region of the core portion 1 (referred to as "core" hereinafter) on the line L1, the region of a first cladding 2 on the line L1, the region of a second cladding 30 on the line L1, and the region of a third cladding 4 on the line L1. Also, the vertical axis of the refractive index profile in the figure indicates the relative index difference with reference to pure silica glass.

The dispersion-compensating fiber according to the present invention is an optical waveguide mainly composed of silica glass (referred to as "$SiO_2$ glass" hereinafter). The core 1 positioned at the center contains a high concentration (about 10 mol % to 30 mol % or, more preferably, about 20 mol % to 25 mol %) of $GEO_2$, whereby its refractive index is controlled so as to become high. The first cladding 2 is doped with fluorine as an index reducer so as to reduce the refractive index, and is disposed outside of the core 1, whereby a large difference in refractive index is obtained therebetween. Also, the second cladding 3 (comprised of pure silica glass or $SiO_2$ glass doped with an impurity for reducing glass viscosity) is formed outside of the first cladding 2. As depicted, the light traveling through this fiber spreads over the inside of the second cladding 3 around the core 1. Accordingly, the region outside of the second cladding 3 is a glass region which substantially does not contribute to propagation of signal light. In the dispersion-compensating fiber according to the present invention, this glass region (third cladding 4) is doped with a predetermined amount of fluorine, thereby attaining a glass viscosity lower than that of pure silica glass at a predetermined temperature.

Here, reference marks in the refractive index profile in FIG. 2 will be explained. In this refractive index profile, 2a, 2b, and 2c respectively indicate the outer diameter (core diameter) of the core 1, the outer diameter of the first cladding 2, and the outer diameter of the second cladding 3. Also, $\Delta$ indicates the relative index difference with reference to pure silica glass as follows:

$$\Delta^+ = (n_1 - n_o)/n_o$$

$$\Delta^- = (n_2 - n_o)/n_o$$

$$\Delta P = (n_3 - n_o)/n_o$$

$$\Delta J = (n_4 - n_o)/n_o$$

wherein $n_o$ is the refractive index of pure silica glass (pure glassy $SiO_2$), $n_1$ is the refractive index of the core 1, $n_2$ is the refractive index of the first cladding 2, $n_3$ is the refractive index of the second cladding 3, and $n_4$ is the refractive index of the third cladding 4. Therefore, a negative $\Delta$ of a predetermined glass region means that the refractive index of the region is set lower than that of pure silica glass.

In the following, the method for determining the outer diameter of the second cladding 3 will be explained. As mentioned above, in a single-mode optical fiber, the intensity distribution of propagated light not only exists in the core 1 but also spreads over the cladding portion nearby (see FIG. 2). Roughly speaking, light travels while spreading around the core 1 over a range which is about five to six times that of the mode field diameter (MFD). Accordingly, even when fluorine or the like is added to the glass region (corresponding to physical cladding) positioned outside of the glass region (corresponding to optical cladding) through which the light travels, thereby changing the refractive index of the former region, the optical characteristics of the optical fiber are not at all influenced thereby.

Figure 5:
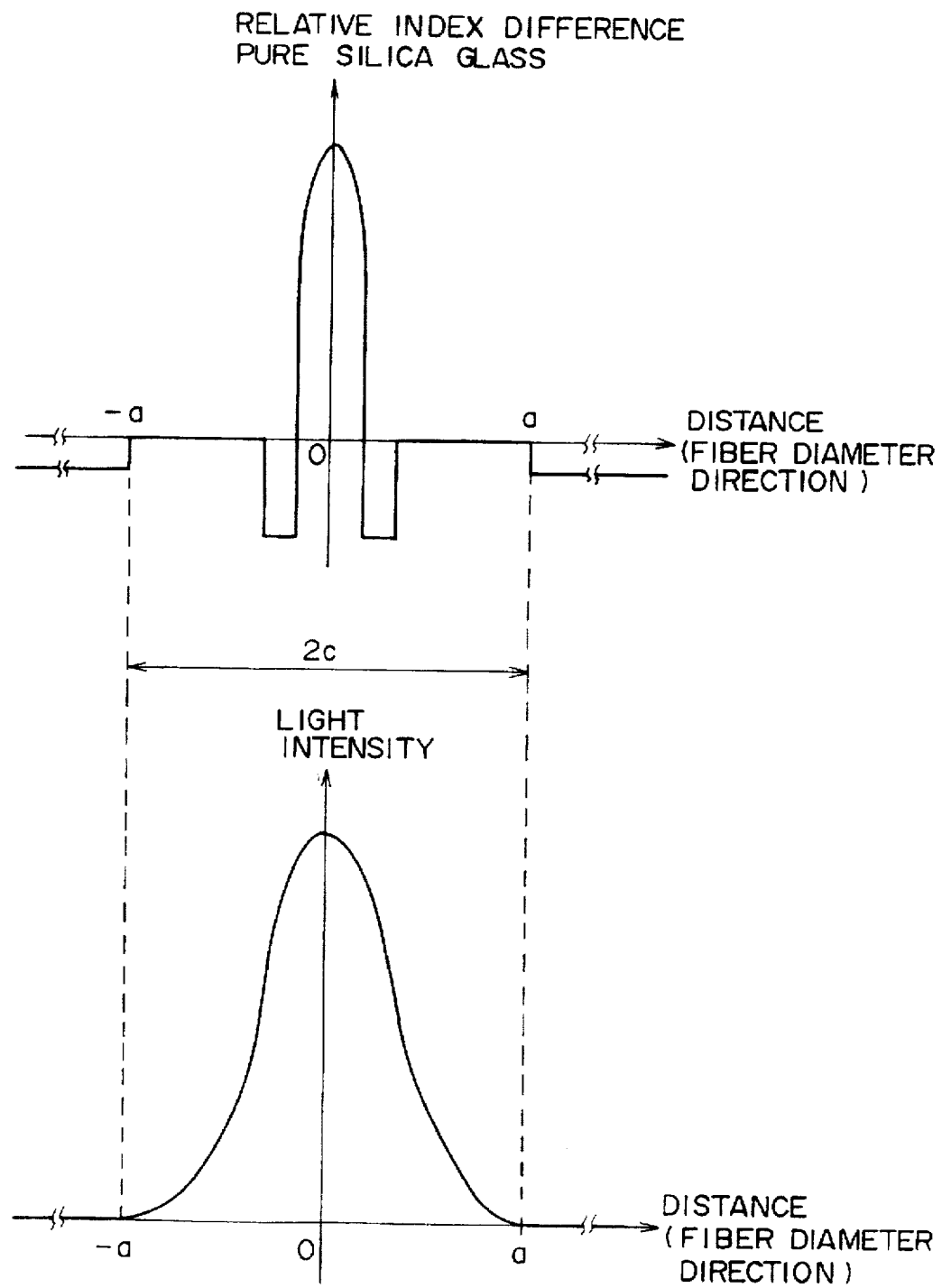
FIG. 5 is a view showing a refractive index profile and a light intensity distribution corresponding thereto in reference to calculation of the outer diameter of the second cladding.

The outer diameter of the second cladding 3 is determined more strictly in view of the intensity distribution of the light traveling through the fiber. As shown in FIG. 5, assuming that the center of the core 1 is origin o, the distance from the center o of the core 1 to the outer diameter of the second cladding 3 is a, the light intensity between o and a in the optical fiber cross section is $P_{o-a}$ and the whole light intensity is 1; their relationship is expressed as:

$$P_{o-a} = 1 - \exp(-2a^2/\omega^2)$$

wherein $\omega$ is the mode field diameter of the fiber. When the value of a at which $1 - P_{o-a} = \exp(-2a^2/\omega^2)$ becomes small enough to be negligible is determined, the light intensity at the position of thus determined distance a can be considered substantially zero.

Here, calculations were performed assuming that the value of $1 - P_{o-a}$ took three kinds of values, i.e., $10^{-30}$, $10^{-40}$, and $10^{-50}$. The results of calculation are shown in tables of FIGS. 6 and 7.

Specifically, FIG. 6 shows the results of calculation of sample Nos. 1 to 6 where $\Delta^+$ is set to 2.5%, whereas FIG. 7 shows the results of calculation of sample Nos. 1 to 7 where $\Delta^+$ is set to 2.1%. In this calculation, with respect to the outer diameter of the core 1 (2a in the refractive index profile shown in FIG. 2) and the outer diameter of the first cladding 2 (2b in the refractive index profile shown in FIG. 2), the outer diameters of their corresponding various kinds of the second cladding 3 (2c in the refractive index profile shown in FIG. 2) were determined. Here, these tables also show the dispersion characteristics (dispersion value and dispersion slope value) calculated by a finite element method.

The outer diameters of the core 1 shown in FIGS. 6 and 7 are within a range (2 to 4 μm) of the core diameter which is suitable for the dispersion-compensating fiber. The core diameter smaller than the lower limit of this range is undesirable since bending loss of the fiber becomes greater. By contrast, when the core diameter is larger than the upper limit of this range, the absolute value of dispersion slope becomes small, whereby the fiber does not effectively function as the dispersion-compensating fiber.

Figure 3:
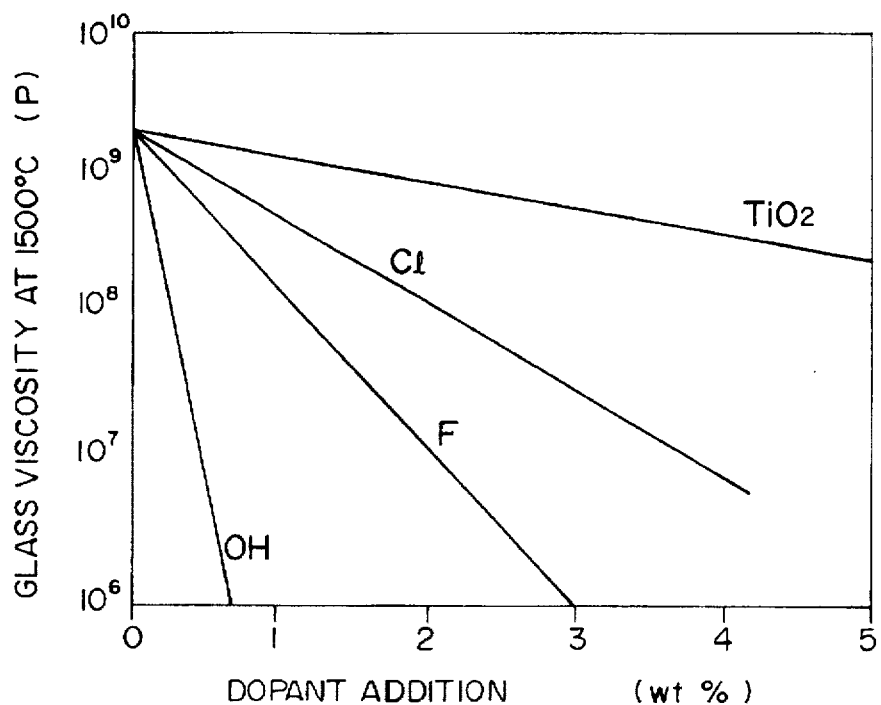
FIG. 3 is a graph showing the relationship between dopant addition of typical impurities for controlling refractive index of silica glass and their resulting glass viscosity at a predetermined temperature.

At the glass region outside of thus defined outer diameter of the second cladding 3, disposed is the third cladding 4 (also known as jacket layer) doped with an impurity such as fluorine, chlorine, germanium, phosphorus, or boron which is used for lowering the glass viscosity of $SiO_2$ glass, i.e., the main ingredient thereof, at a predetermined temperature. FIG. 3 shows the relationship between dopant addition of typical impurities for controlling refractive index of silica glass and their resulting glass viscosity at 1,500° C., and unit of the glass viscosity of the vertical axis is poise (symbol: P, 10 P=1 N·s/$m^2$).

Here, though the above-mentioned calculation is performed while $1 - P_{o-a}$ is assumed to be three kinds of values $10^{-30}$, $10^{-40}$, and $10^{-50}$ in order to determine a cladding region which does not influence the transmission characteristic; magnitudes of these values are within the scope of a design matter and may be appropriately selected according to characteristics of the fiber and the like. In the following embodiments, the dispersion-compensating fiber is designed under a condition where $1 - P_{o-a} = 10^{-50}$ as a value which does not at all influence the transmission characteristic.

Also, any optical fiber satisfying the conditions shown in FIGS. 6 and 7 has a negative dispersion slope and a dispersion value of about −50 ps/km/nm or lower, whereby it can effectively function as a dispersion-compensating fiber.

In the following, a process for fabricating the dispersion-compensating fiber according to the present invention will be explained with reference to FIG. 8. In the fabricating process explained hereinafter, an impurity for controlling refractive index such as fluorine was used as an impurity for reducing the glass viscosity of the $SiO_2$ glass at a predetermined temperature and, while its ratio of doping amount was changed, dispersion-compensating fibers were fabricated. This fabricating process was performed according to a VAD method.

Figure 8:
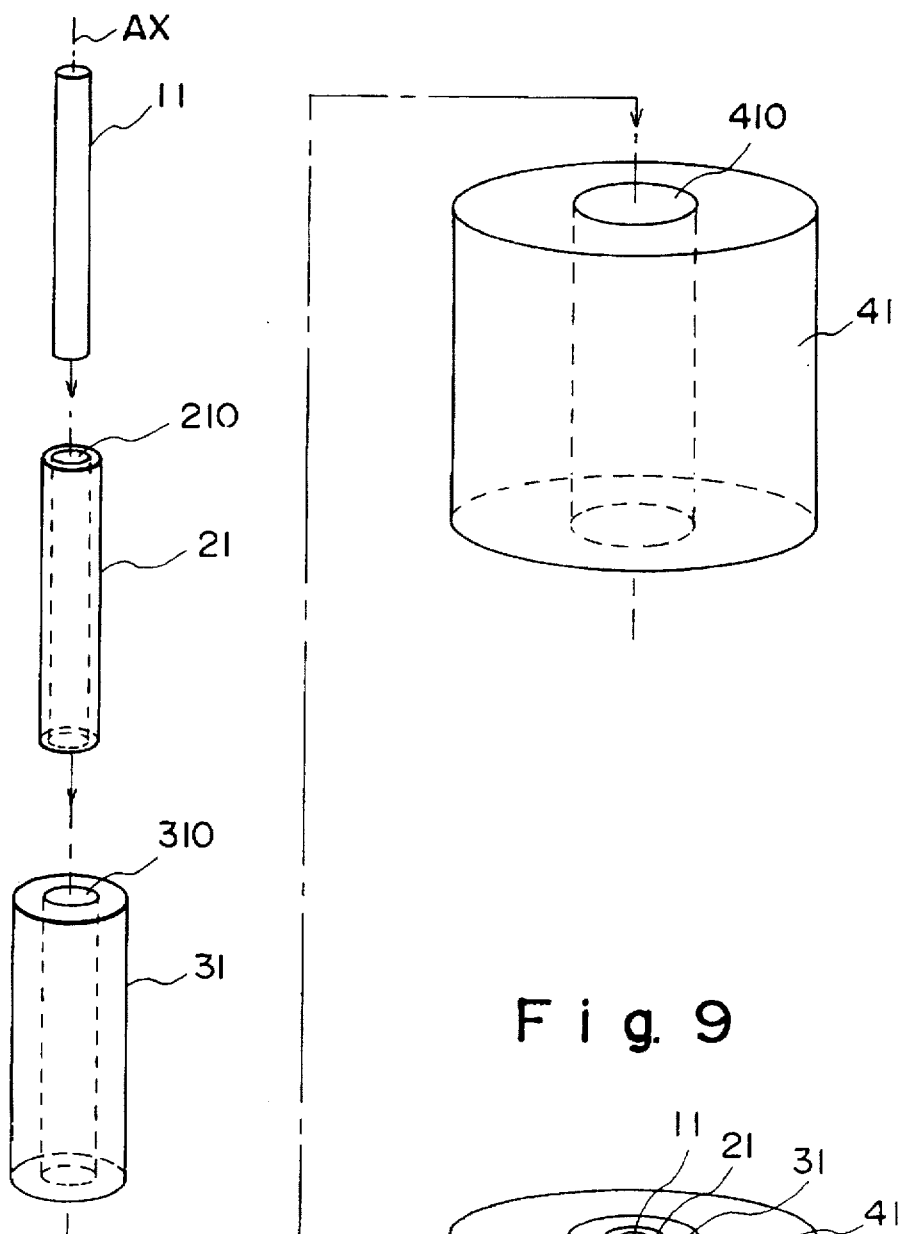
FIG. 8 is a process chart showing a part of a process for fabricating the dispersion-compensating fiber according to the present invention.
Figure 9:
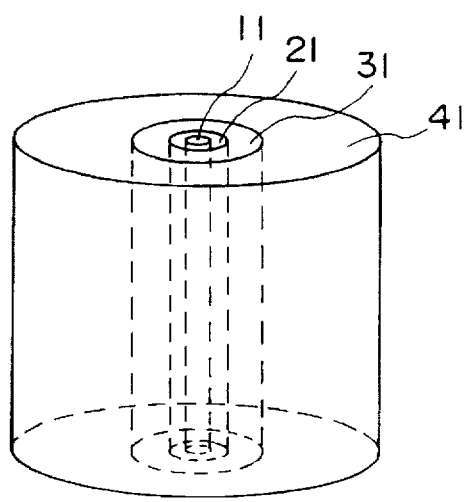
FIG. 9 is a view showing a fiber preform obtained by way of the step shown in FIG. 8.

First, as shown in FIG. 8, while the doping amount of $GeO_2$ in $SiO_2$ glass is adjusted such that the refractive index decreases by the second to fifth power of the distance or stepwise from its center to the periphery, a cylindrical core member 11 having a refractive index $n_1$ is manufactured. Subsequently, fluorine is uniformly added to $SiO_2$ glass so as to manufacture a first cladding member 21 having a refractive index reduced to $n_2$, and a hole 210 is formed at the center of thus obtained first cladding member 21 along the axis AX shown in FIG. 8. Then, into the hole 210 formed in the first cladding member 21, the core member 11 obtained beforehand is inserted. Further, a cylindrical second cladding member 31 mainly composed of $SiO_2$ glass having a refractive index of $n_3$ is manufactured, and a hole 310 is formed at the center thereof along the axis Ax. Though $n_3=n_o$ in the case where the second cladding member 31 is pure silica glass (first and second embodiments explained later), an impurity for controlling refractive index may also be added to the second cladding member 31 (third and fourth embodiments explained later). Into the hole 310 formed in the second cladding member 31, inserted are the core member 11 and the first cladding member 21 which have been united together into a cylindrical form beforehand. Further, fluorine is uniformly added to $SiO_2$ glass so as to reduce the glass viscosity thereof, thereby manufacturing a cylindrical third cladding member 41 with a refractive index of $n_4$, and a hole 410 is formed at the center thereof along the axis AX. Then, the core member 11, the first cladding member 21, and the second cladding member 31, which have been united together beforehand, are inserted into the hole 410 and heated to form an optical fiber preform (see FIG. 9). Thereafter, the obtained fiber preform is drawn to fabricate a single-mode dispersion-compensating fiber having an outer diameter of 125 µm. The drawing step for thus obtained fiber preform is disclosed, for example, in U.S. Pat. No. 4,123,242.

First embodiment

Figure 10:
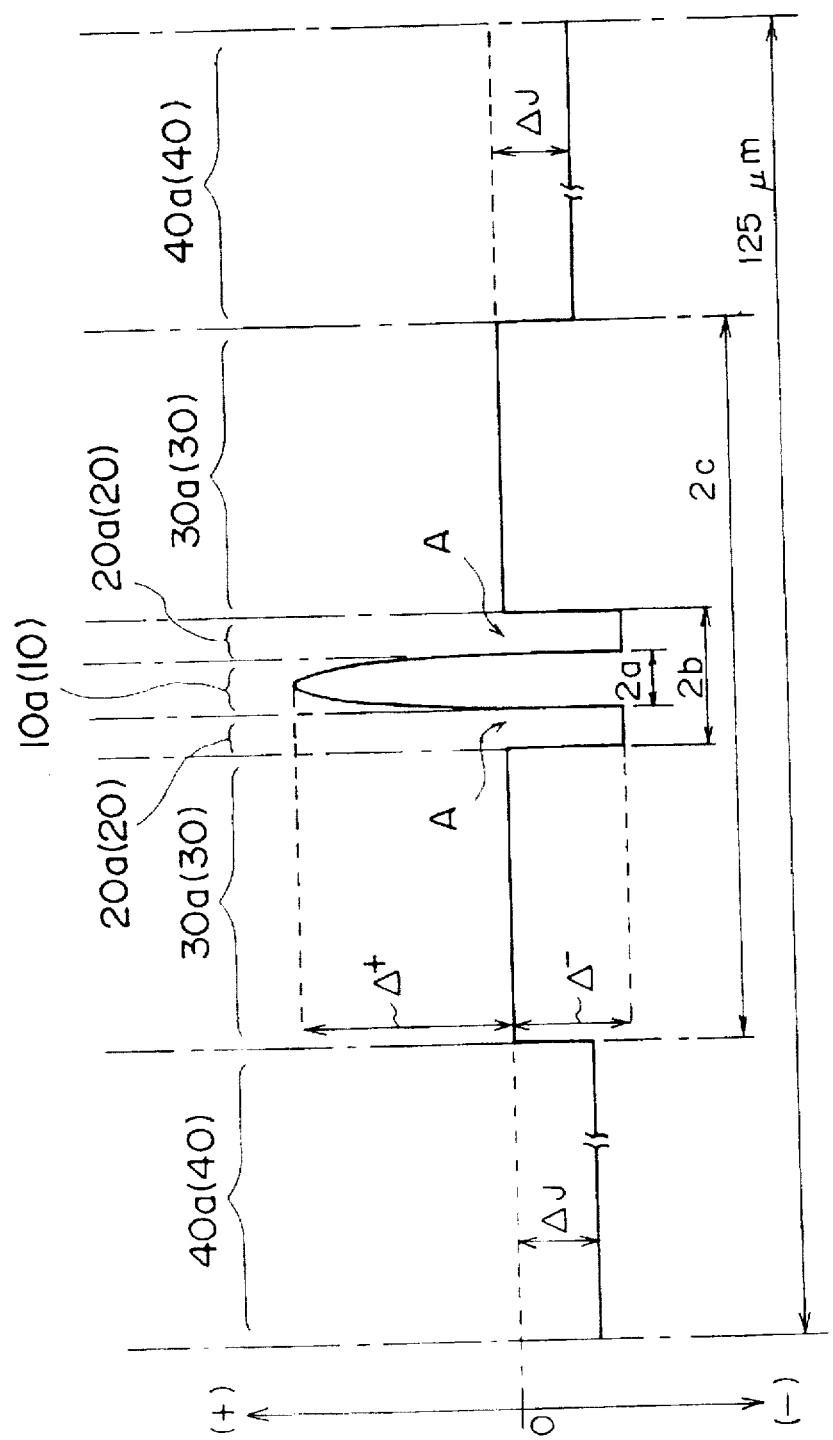
FIG. 10 is a chart showing a refractive index profile of a first embodiment of the dispersion-compensating fiber according to the present invention.

In the following, a first embodiment of the dispersion-compensating fiber according to the present invention will be explained with reference to FIG. 10. Here, FIG. 10 is a chart showing the refractive index profile of the first embodiment in which regions 10a, 20a, 30a, and 40a respectively correspond to the regions 10, 20, 30, and 40 in FIG. 2. Accordingly, the horizontal axis of the refractive index profile shown in FIG. 10 denotes the positions on the line L1 in the fiber cross section of FIG. 2. Also, the vertical axis of the refractive index profile indicates the relative index difference with reference to pure silica glass.

The core 1 and the first to third claddings 2 to 4 in this embodiment are designed as follows:

Core 1: $SiO_2$ glass containing a predetermined amount of $GeO_2$ (with increased refractive index).

First cladding 2: $SiO_2$ glass containing a predetermined amount of fluorine (with reduced refractive index).

Second cladding 3: Pure silica glass (pure glassy $SiO_2$).

Third cladding 4: $SiO_2$ glass containing a predetermined amount of fluorine (with reduced refractive index), whereby the glass viscosity at the time of drawing is controlled so as to be lower than that of the second cladding 3.

First experiment of first embodiment

The inventors prepared dispersion-compensating fibers having the structure of the above-mentioned first embodiment (FIG. 10) under the following conditions. Specifically, a plurality of kinds of fiber preforms were prepared under the condition where $\Delta^+=2.9\%$, $\Delta^-=-0.36\%$, and $\Delta P=0\%$, while the value of $\Delta J$ was changed among 0%, -0.1%, -0.3%, -0.4%, -0.6%, and -0.7%. Then, with a tension of 9.8 kg/mm$^2$ at the time of drawing, each fiber preform was drawn with a constant drawing velocity, thereby fabricating a dispersion-compensating fiber in which $2a=2.25$ µm, $2b=7.5$ µm, and $2c=39$ µm. With respect to light having a wavelength of 1.55 µm, each of thus obtained dispersion-compensating fibers exhibited a dispersion characteristic such that the dispersion value was -144 ps/km/nm and the dispersion slope was -0.45 ps/km/nm$^2$.

Figure 11:
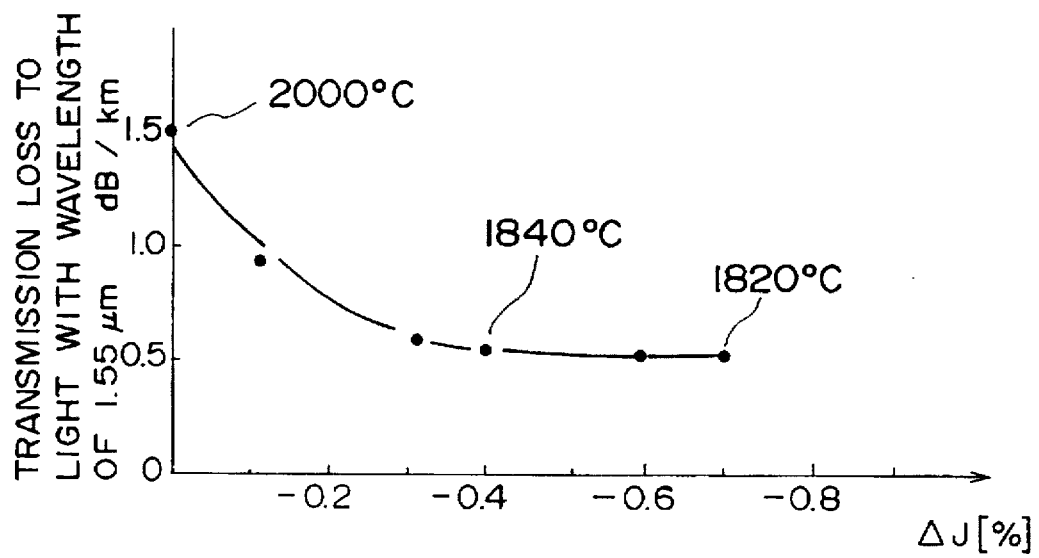
FIG. 11 is a graph showing the relationship between ΔJ (relative index difference of the third cladding with respect to pure silica glass) and optical transmission loss in dispersion-compensating fiber samples of the first embodiment fabricated in a first experiment, wherein the dispersion characteristic of each dispersion-compensating fiber sample with respect to light having a wavelength of 1.55 µm is such that the dispersion value is −144 ps/km/nm and the dispersion slope is −0.45 ps/km/nm².

FIG. 11 shows results of measurement of optical transmission loss with respect to light having a wavelength of 1.55 µm for the respective dispersion-compensating fibers having the above-mentioned $\Delta J$ values.

In the graph shown in FIG. 11, the conventional dispersion-compensating fiber ($\Delta J=0\%$: the third cladding being pure silica glass) doped with no fluorine was drawn at a higher temperature of about 2,000° C., since its glass viscosity is high. On the other hand, the drawing temperature is about 1,840° C. when $\Delta J=-0.4\%$ and about 1,820° C. when $\Delta J=-0.7\%$ (concentration of fluorine being 2 wt %). Thus, the drawing temperature tends to decrease as the ratio of the doping amount of fluorine in the third cladding 4 is greater (as the relative index difference $\Delta J$ decreases). This is due to the fact that the glass viscosity of the third cladding 4 at the time of drawing becomes further lower than that of pure silica glass (second cladding 3) as the ratio of doping amount of fluorine increases. Accordingly, when such a third cladding 4 is provided, drawing can be performed at a temperature lower than that at the time of fabricating the conventional dispersion-compensating fiber, thereby reducing optical transmission loss.

Figure 4:
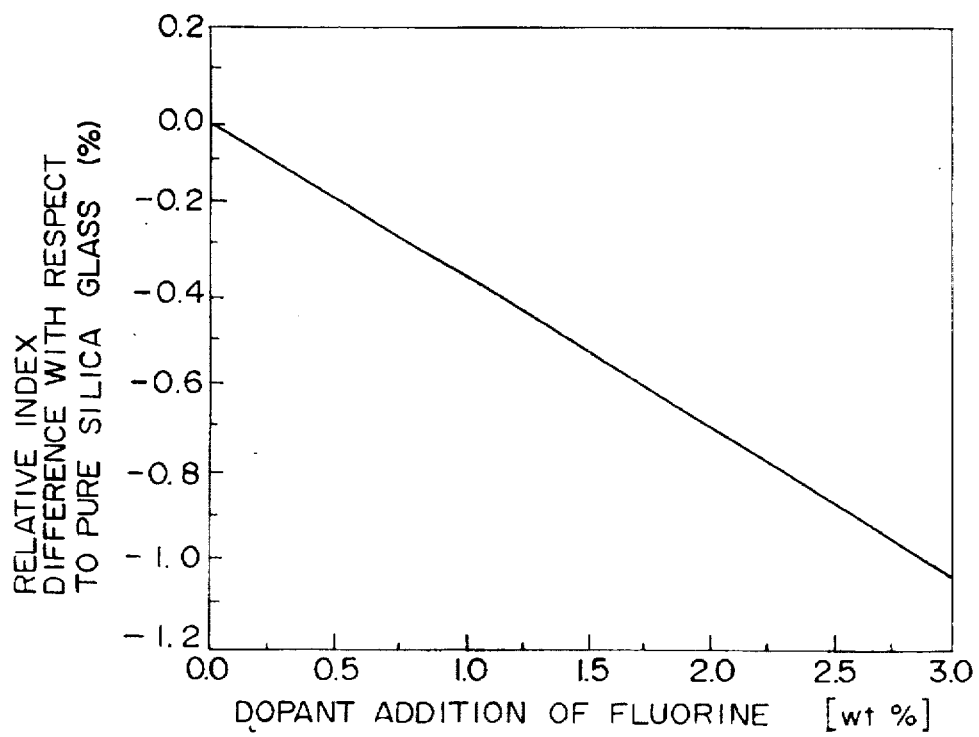
FIG. 4 is a graph showing the relationship between the dopant addition (wt %) of fluorine added to silica glass and the resulting relative index difference (%) with respect to pure silica glass.

Here, FIG. 4 shows the relationship between the dopant addition (wt %) of fluorine in $SiO_2$ glass and the resulting relative index difference (%) with respect to pure silica glass.

Second experiment of first embodiment

Further, the inventors prepared dispersion-compensating fibers having the structure of the above-mentioned first embodiment (FIG. 10) under the following conditions. Specifically, a plurality of kinds of fiber preforms were prepared under the condition where $\Delta^+=2.6\%$, $\Delta^-=-0.35\%$, and $\Delta P=0\%$, while the value of $\Delta J$ was changed among 0%, -0.1%, -0.3%, -0.5%, -0.6%, and -0.7%. Then, with a tension of 9.8 kg/mm$^2$ at the time of drawing, each fiber preform was drawn with a constant drawing velocity, thereby fabricating a dispersion-compensating fiber in which $2a=2.6$ µm, $2b=8.8$ µm, and $2c=46$ µm. With respect to light having a wavelength of 1.55 µm, each of thus obtained dispersion-compensating fiber exhibited a dispersion characteristic such that the dispersion value was -100 ps/km/nm and the dispersion slope was -0.2 ps/km/nm$^2$.

Figure 12:
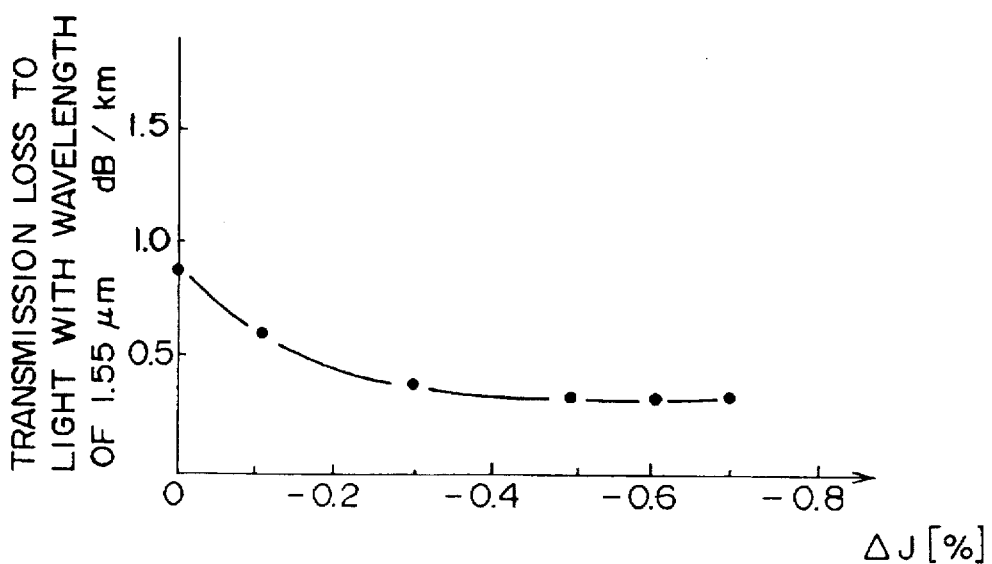
FIG. 12 is a graph showing the relationship between ΔJ (relative index difference of the third cladding with respect to pure silica glass) and optical transmission loss in dispersion-compensating fiber samples of the first embodiment fabricated in a second experiment, wherein the dispersion characteristic of each dispersion-compensating fiber sample with respect to light having a wavelength of 1.55 µm is such that the dispersion value is −100 ps/km/nm and the dispersion slope is −0.2 ps/km/nm².

FIG. 12 shows results of measurement of optical transmission loss with respect to light having a wavelength of 1.55 µm for the respective dispersion-compensating fibers having the above-mentioned $\Delta J$ values.

In this case (see FIG. 12), as in the case of the first experiment mentioned above, it is seen that the optical transmission loss decreases as the ratio of the doping amount of fluorine in the third cladding 4 is greater (as the relative index difference ΔJ decreases).

Third experiment of first embodiment

Further, the inventors prepared dispersion-compensating fibers having the structure of the above-mentioned first embodiment (FIG. 10) under the following conditions. Specifically, a plurality of kinds of fiber preforms were prepared under the condition where $\Delta^+=2\%$, $\Delta^-=-0.35\%$, and $\Delta P=0\%$, while the value of ΔJ was changed among 0%, $-0.1\%$, $-0.2\%$, $-0.3\%$, $-0.5\%$, $-0.6\%$, and $-0.7\%$. Then, with a tension of 9.8 kg/mm² at the time of drawing, each fiber preform was drawn with a constant drawing velocity, thereby fabricating a dispersion-compensating fiber in which $2a=3$ μm, $2b=10$ μm, and $2c=53$ μm. With respect to light having a wavelength of 1.55 μm, each dispersion-compensating fiber thus obtained exhibited a dispersion characteristic such that the dispersion value was −85 ps/km/nm and the dispersion slope was −0.2 ps/km/nm².

Figure 13:
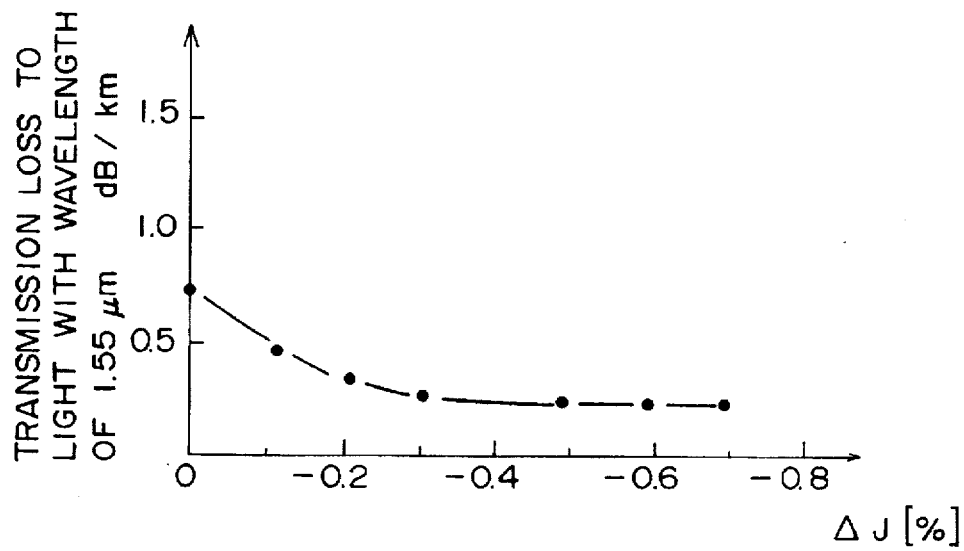
FIG. 13 is a graph showing the relationship between ΔJ (relative index difference of the third cladding with respect to pure silica glass) and optical transmission loss in dispersion-compensating fiber samples of the first embodiment fabricated in a third experiment, wherein the dispersion characteristic of each dispersion-compensating fiber sample with respect to light having a wavelength of 1.55 µm is such that the dispersion value is −85 ps/km/nm and the dispersion slope is −0.2 ps/km/nm².

FIG. 13 shows results of measurement of optical transmission loss with respect to light having a wavelength of 1.55 μm for the respective dispersion-compensating fibers having the above-mentioned ΔJ values.

In this case (see FIG. 13), as in the case of the first and second experiments mentioned above, it is seen that the optical transmission loss decreases as the ratio of the doping amount of fluorine in the third cladding 4 is greater (as the relative index difference ΔJ decreases).

Fourth experiment of first embodiment

In the following, the results of actual measurement of the relationship between the drawing tension and the optical transmission loss of the resulting dispersion-compensating fiber will be explained. In this experiment, the preform identical to that prepared in the first experiment in all the values except for the condition of ΔJ=−0.35% was used, and drawing was performed with a variety of tension values at the time of drawing, thereby fabricating dispersion-compensating fibers. Here, FIG. 14 is a graph showing results of measurement of optical transmission loss with respect to light having a wavelength of 1.55 μm for the dispersion-compensating fibers obtained at the respective drawing tension values.

Figure 14:
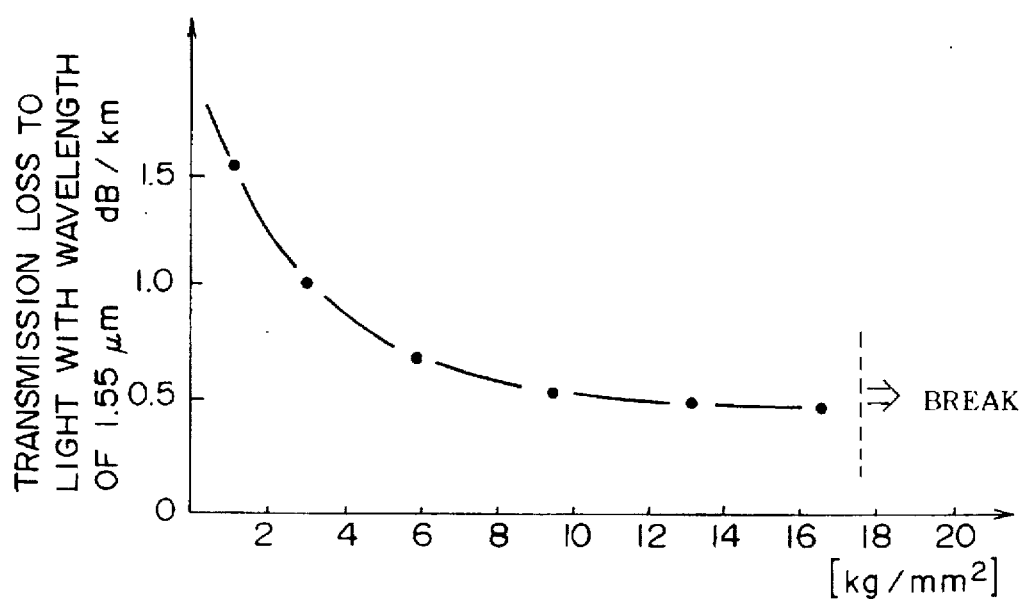
FIG. 14 is a graph showing the relationship between the drawing tension at the time of fabricating and the resulting optical transmission loss in the dispersion-compensating fiber fabricated in the first experiment (a fourth experiment)

From the graph shown in FIG. 14, it is seen that the optical transmission loss decreases as the tension at the time of drawing increases. When drawn with a large tension exceeding 16 kg/mm², the optical fiber was broken. Also, while it is desirable, as a matter of course, that the optical transmission loss be as low as possible, it is desirably a value lower than 1.0 dB/km in practice. In view of these points, it is desirable for the fiber preform to be drawn with a tension of at least 4 kg/mm² or, more preferably, not smaller than 5 kg/mm² but not exceeding 16 kg/mm² applied thereto.

Figure 15:
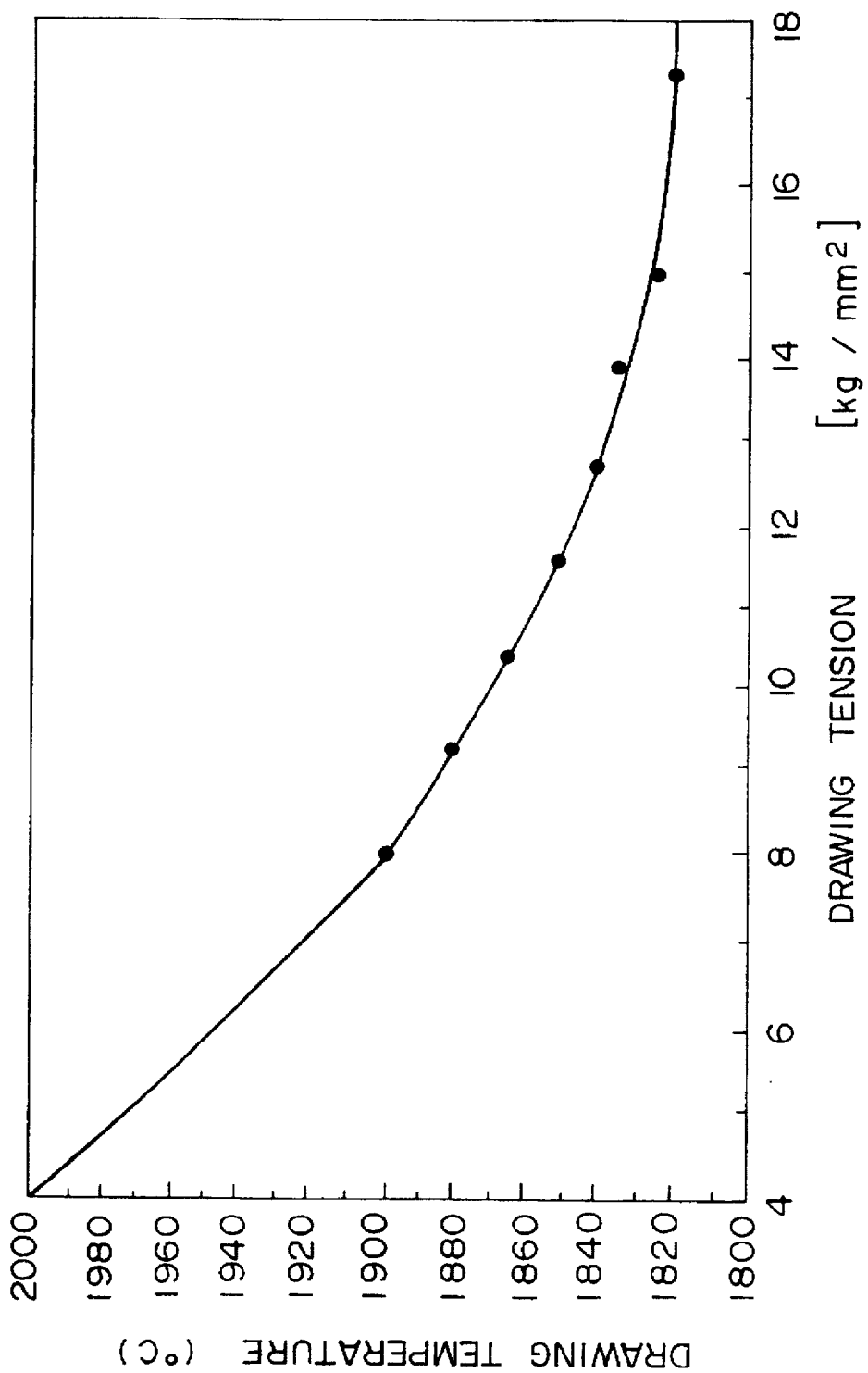
FIG. 15 is a graph showing the general relationship between drawing tension and drawing temperature in the case where drawing velocity is constant at the time of drawing.

For reference, FIG. 15 shows a general relationship between drawing temperature and drawing tension in the case where drawing velocity v is constantly held at 100 m/min. The formation of the subject fiber preform is identical to that of the first experiment (ΔJ=−0.35%). Since this relationship greatly fluctuates according to the outer diameter of the fiber preform, the inner diameter of the furnace, atmosphere, and the like, the graph may be translated up and down on the order of several tens of °C, depending on these conditions. Here, the relationship between drawing tension and drawing temperature shown in FIG. 15 is indicated regardless of the present invention, without suggesting any condition for fabricating the dispersion-compensating fiber according to the present invention.

Second embodiment

Figure 16:
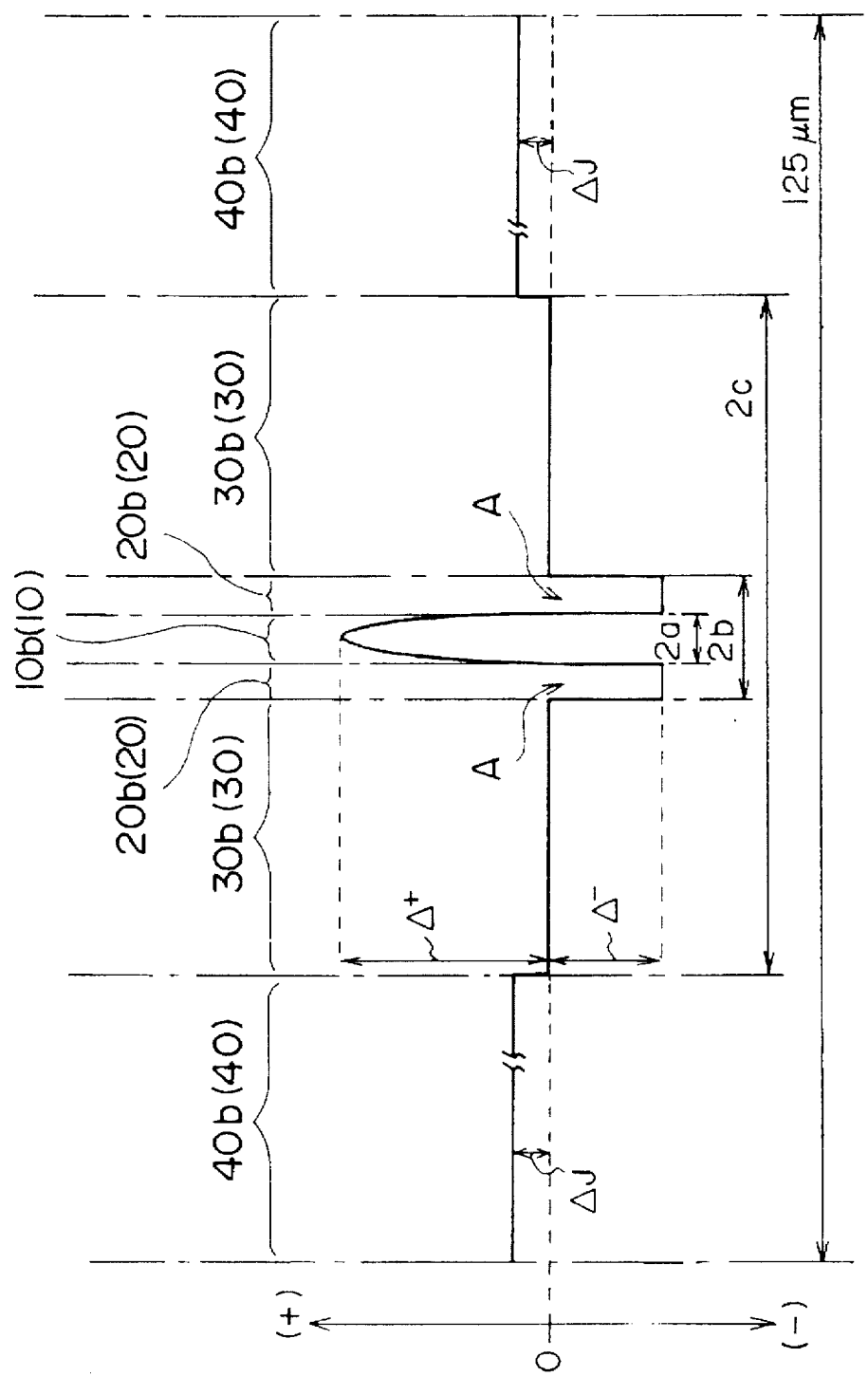
FIG. 16 is a chart showing a refractive index profile of a second embodiment of the dispersion-compensating fiber according to the present invention.

In the following, a second embodiment of the dispersion-compensating fiber according to the present invention will be explained with reference to FIG. 16. Here, FIG. 16 is a chart showing the refractive index profile of the second embodiment, in which regions $10b$, $20b$, $30b$, and $40b$ respectively correspond to the regions 10, 20, 30, and 40 in FIG. 2. Accordingly, the horizontal axis of the refractive index profile shown in FIG. 16 denotes the positions on the line L1 in the fiber cross section of FIG. 2. Also, the vertical axis of the refractive index profile indicates the relative index difference with reference to pure silica glass.

The core 1 and the first to third claddings 2 to 4 in this embodiment are designed as follows:

Core 1: $SiO_2$ glass containing a predetermined amount of $GeO_2$ (with increased refractive index).

First cladding 2: $SiO_2$ glass containing a predetermined amount of fluorine (with reduced refractive index).

Second cladding 3: Pure silica glass (pure glassy $SiO_2$).

Third cladding 4: $SiO_2$ glass containing a predetermined amount of chlorine (with increased refractive index), whereby the glass viscosity at the time of drawing is controlled so as to be lower than that of the second cladding 3.

The second embodiment structurally differs from the above-mentioned the first embodiment in terms of the impurity added to the third cladding 4. Also, in this structure, glass viscosity at the time of drawing can be reduced.

The inventors prepared dispersion-compensating fibers having the structure of the second embodiment (FIG. 16) under the following conditions. Specifically, a plurality of kinds of fiber preforms were prepared under the condition where $\Delta^+=2.1\%$, $\Delta^-=-0.35\%$, and $\Delta P=0\%$, while the value of ΔJ was changed among 0%, 0.03%, 0.08%, and 0.12%. Then, with a tension of 9.8 kg/mm² at the time of drawing, each fiber preform was drawn with a constant drawing velocity, thereby fabricating a dispersion-compensating fiber in which $2a=2.75$ μm, $2b=7.9$ μm, and $2c=47$ μm. With respect to light having a wavelength of 1.55 μm, each of thus obtained dispersion-compensating fibers exhibited a dispersion characteristic such that the dispersion value was −85 ps/km/nm and the dispersion slope was −0.2 ps/km/nm².

Third embodiment

Figure 17:
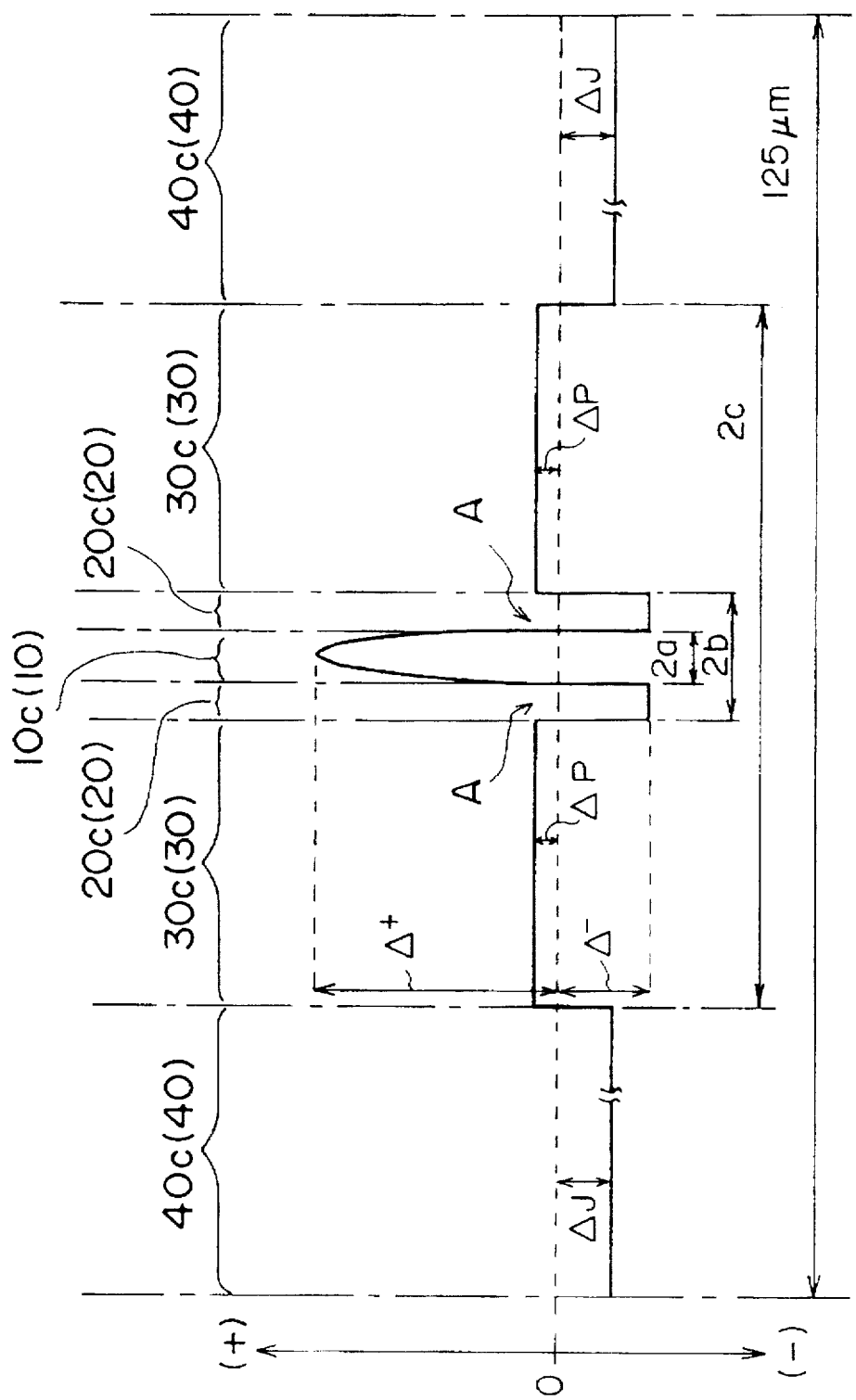
FIG. 17 is a chart showing a refractive index profile of a third embodiment of the dispersion-compensating fiber according to the present invention.

In the following, a third embodiment of the dispersion-compensating fiber according to the present invention will be explained with reference to FIG. 17. Here, FIG. 17 is a chart showing the refractive index profile of the third embodiment, in which regions $10c$, $20c$, $30c$, and $40c$ respectively correspond to the regions 10, 20, 30, and 40 in FIG. 2. Accordingly, the horizontal axis of the refractive index profile shown in FIG. 17 denotes the positions on the line L1 in the fiber cross section of FIG. 2. Also, the vertical axis of the refractive index profile indicates the relative index difference with reference to pure silica glass.

The core 1 and the first to third claddings 2 to 4 in this embodiment are designed as follows:

Core 1: $SiO_2$ glass containing a predetermined amount of $GeO_2$ (with increased refractive index).

First cladding 2: $SiO_2$ glass containing a predetermined amount of fluorine (with reduced refractive index).

Second cladding 3: $SiO_2$ glass containing a predetermined amount of chlorine (with increased refractive index).

whereby the glass viscosity at the time of drawing is controlled so as to be lower than that of pure silica glass.

Third cladding 4: SiO$_2$ glass containing a predetermined amount of fluorine (with reduced refractive index), whereby the glass viscosity at the time of drawing is controlled so as to be lower than that of pure silica glass.

The third embodiment structurally differs from the above-mentioned the first embodiment in that chlorine is added to the second cladding 3. Also, in this structure, the glass viscosity at the time of drawing can be lowered. In the case where the second cladding 3 is pure silica glass (the first and second embodiments), when the drawing tension concentrates too much on the second cladding 3, which has a glass viscosity higher than that of the third cladding 4, at the time of drawing, it may result in a change in refractive index (decrease in refractive index due to residual stress) in this glass region. The configuration of the third embodiment overcomes this problem. Also, a material such as chlorine which increases refractive index is selected as the impurity to be added to the second cladding 3, in order to lower the refractive index of the first cladding 2 while increasing the refractive index of the second cladding 3, thereby controlling the difference in refractive index between the first and second claddings 2 and 3 so as to deepen the depression region A (region defined by the respective refractive index profiles of the region 10c corresponding to the core portion 1 of FIG. 2, the region 20c corresponding to the first cladding 2 of FIG. 2, and the region 30c corresponding to the second cladding 3 of FIG. 2). Also, as the refractive index profile is controlled in this manner, the dispersion characteristic of the dispersion-compensating fiber can be further improved (the absolute value of the dispersion slope can be increased while a sufficient negative dispersion value is obtained).

The inventors prepared dispersion-compensating fibers having the structure of the third embodiment (FIG. 17) under the following conditions. Specifically, a plurality of kinds of fiber preform were prepared under the condition where $\Delta^+=2.1\%$, $\Delta^-=-0.35\%$, and $\Delta P=0.08\%$, while the value of $\Delta J$ was changed among 0%, −0.04%, −0.1%, −0.2%, −0.35%, −0.5%, and −0.7%. Then, with a tension of 9.8 kg/mm$^2$ at the time of drawing, each fiber preform was drawn with a constant drawing velocity, thereby fabricating a dispersion-compensating fiber in which $2a=2.8$ µm, $2b=8$ µm, and $2c=46$ µm. With respect to light having a wavelength of 1.55 µm, each of thus obtained dispersion-compensating fibers exhibited a dispersion characteristic such that the dispersion value was −101 ps/km/nm and the dispersion slope was −0.25 ps/km/nm$^2$.

Fourth embodiment

Figure 18:
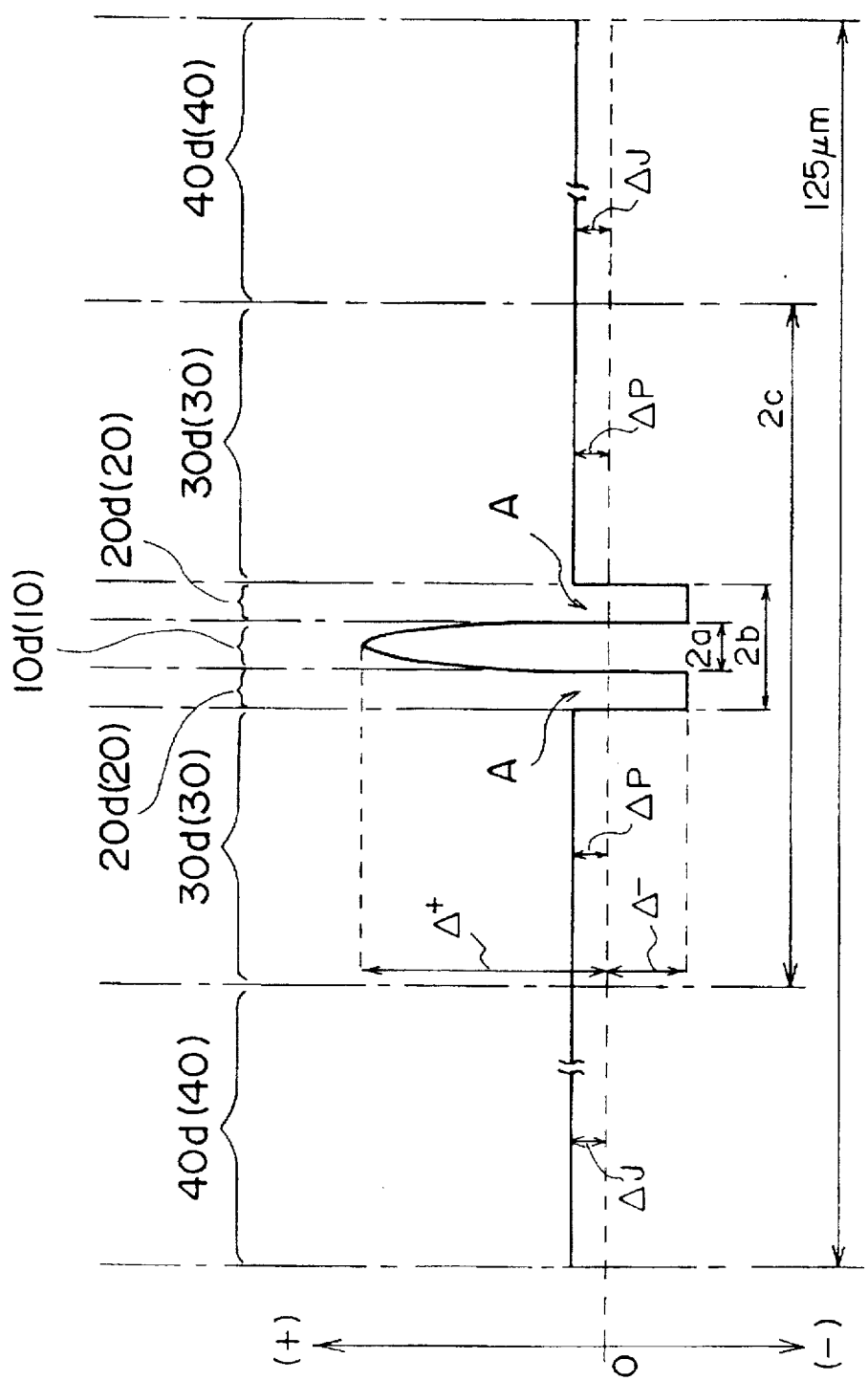
FIG. 18 is a chart showing a refractive index profile of a fourth embodiment of the dispersion-compensating fiber according to the present invention.

In the following, a fourth embodiment of the dispersion-compensating fiber according to the present invention will be explained with reference to FIG. 18. Here, FIG. 18 is a chart showing the refractive index profile of the fourth embodiment, in which regions 10d, 20d, 30d, and 40d respectively correspond to the regions 10, 20, 30, and 40 in FIG. 2. Accordingly, the horizontal axis of the refractive index profile shown in FIG. 18 denotes the positions on the line L1 in the fiber cross section of FIG. 2. Also, the vertical axis of the refractive index profile indicates the relative index difference with reference to pure silica glass.

The core 1 and the first to third claddings 2 to 4 in this embodiment are designed as follows:

Core 1: SiO$_2$ glass containing a predetermined amount of GeO$_2$ (with increased refractive index).

First cladding 2: SiO$_2$ glass containing a predetermined amount of fluorine (with reduced refractive index).

Second cladding 3: SiO$_2$ glass containing a predetermined amount of chlorine (with increased refractive index), whereby the glass viscosity at the time of drawing is controlled so as to be lower than that of pure silica glass.

Third cladding 4: SiO$_2$ glass containing a predetermined amount of chlorine (with increased refractive index), whereby the glass viscosity at the time of drawing is controlled so as to be lower than that of pure silica glass.

The fourth embodiment structurally differs from the above-mentioned the third embodiment in terms of the impurity added to the third cladding 4. Namely, in the fourth embodiment, chlorine is added to each of the second and third claddings 3 and 4. In particular, in this case, when the glass viscosity of the second cladding 3 and that of the third cladding 4 at the time of drawing are made to coincide with each other (doping amounts of chlorine in glass regions 3 and 4 are made to coincide with each other), the process for fabricating the dispersion-compensating fiber can be simplified.

The inventors prepared dispersion-compensating fibers having the structure of the fourth embodiment (FIG. 18) under the following conditions. Specifically, a plurality of kinds of fiber preforms were prepared under the condition where $\Delta^+=2.1\%$, $\Delta^-=-0.35\%$, and $\Delta P=0.08\%$, while the value of $\Delta J$ was changed among 0%, 0.03%, 0.08%, and 0.7%. Then, with a tension of 9.8 kg/mm$^2$ at the time of drawing, each fiber preform was drawn with a constant drawing velocity, thereby fabricating a dispersion-compensating fiber in which $2a=2.7$ µm, $2b=7.7$ µm, and $2c=46$ µm. With respect to light having a wavelength of 1.55 µm, each of thus obtained dispersion-compensating fibers exhibited a dispersion characteristic such that the dispersion value was −101 ps/km/nm and the dispersion slope was −0.3 ps/km/nm$^2$.

Figure 19:
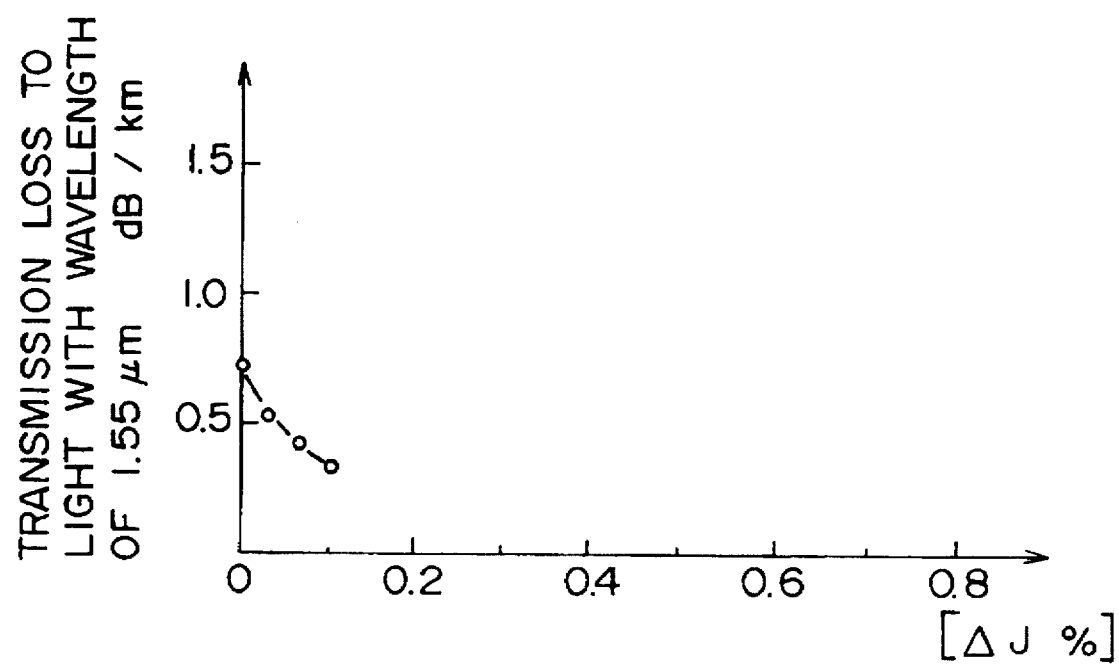
FIG. 19 is a graph showing the relationship between ΔJ (relative index difference of the third cladding with respect to pure silica glass) and optical transmission loss in the dispersion-compensating fiber samples of a fourth embodiment.

FIG. 19 shows results of measurement of optical transmission loss with respect to light having a wavelength of 1.55 µm for the respective dispersion-compensating fibers having the above-mentioned $\Delta J$ values. From the graph shown in FIG. 19, it can be seen that the optical transmission loss decreases as the ratio of doping amount of chlorine in the third cladding 4 increases (as the relative index difference $\Delta J$ is larger).

Here, the inventors have confirmed that the relationship between the relative index difference $\Delta J$ and the optical transmission loss in the above-mentioned samples of the second embodiment substantially coincides with the graph shown in FIG. 13. Also, the inventors have confirmed that the relationship between the relative index difference $\Delta J$ and the optical transmission loss in the above-mentioned samples of the third embodiment substantially coincides with that in the graph shown in FIG. 19.

As described above, in the dispersion-compensating fiber according to the present invention, the third cladding 4, which is a glass region substantially noncontributory to propagation of optical signals and whose glass viscosity at a predetermined temperature is controlled so as to be lower than that of pure silica glass, is disposed outside of the second cladding 3. Accordingly, when drawing is to be performed, the fiber preform can be drawn at a lower temperature. Therefore, even in the case where a dispersion-compensating fiber of a type containing a high concentration of GeO$_2$ in the core 1 is to be fabricated, optical transmission loss can be further reduced.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 223605 filed on Aug. 31, 1995 is hereby incorporated by reference.

What is claimed is:

1. A dispersion-compensating fiber mainly composed of silica glass, said dispersion-compensating fiber comprising:

a core portion containing at least 10 mol % of $GeO_2$ and having an outer diameter of 2 to 4 μm and a predetermined refractive index; and a cladding portion formed around an outer periphery of said core portion and having a refractive index set lower than that of said core portion, said cladding portion comprising:

a first cladding which is a glass region formed around the outer periphery of said core portion in close contact therewith, said first cladding containing a predetermined amount of an impurity for reducing refractive index, having an outer diameter of 4 to 20 μm, and constituting a part of an optical cladding;

a second cladding which is a glass region formed around an outer periphery of said first cladding in close contact therewith, said second cladding having a higher refractive index than said first cladding, and constituting said optical cladding together with said first cladding; and a third cladding which is a glass region formed around an outer periphery of said second cladding in close contact therewith, said third cladding having a lower glass viscosity than said second cladding at a predetermined temperature, and constituting a physical cladding.

2. A dispersion-compensating fiber according to claim 1, wherein said first cladding contains a predetermined amount of fluorine as said impurity.

3. A dispersion-compensating fiber according to claim 1, wherein said third cladding contains 0.1 wt % to 2 wt % of fluorine.

4. A dispersion-compensating fiber according to claim 1, wherein said third cladding contains 0.25 wt % to 1 wt % of chlorine.

5. A dispersion-compensating fiber according to claim 1, wherein said dispersion-compensating fiber has an optical transmission loss of not higher than 1 dB/km with respect to light of 1.55-μm wavelength band.

6. A dispersion-compensating fiber according to claim 1, wherein, with respect to light of 1.55-μm wavelength band, said dispersion-compensating fiber has a dispersion value of not higher than −50 ps/km/nm and a negative dispersion slope.

7. A method of fabricating a dispersion-compensating fiber according to claim 1, said method comprising the steps of:

preparing a member mainly composed of silica glass, said member comprising a core component containing at least 10 mol % of $GeO_2$, a first cladding component which is provided around said core component and contains an impurity for reducing refractive index, a second cladding component which is provided around an outer periphery of said first cladding component and has a higher refractive index than said first cladding component, and a third cladding component which is provided around an outer periphery of said second cladding component and has a lower glass viscosity than said second cladding component at a predetermined temperature;

forming integrally said components so as to yield a fiber preform; and drawing said fiber preform while applying a predetermined tension thereto such that an outer diameter thereof becomes a desired diameter.

8. A method according to claim 7, wherein the drawing tension applied to said fiber preform is 5 to 16 kg/mm$^2$.

9. A method according to claim 7, wherein said first cladding component contains a predetermined amount of fluorine.

10. A method according to claim 7, wherein said third cladding component contains 0.1 wt % to 2 wt % of fluorine.

11. A method according to claim 7, wherein said third cladding component contains 0.25 wt % to 1 wt % of chlorine.

12. A dispersion-compensating fiber mainly composed of silica glass, said dispersion-compensating fiber comprising:

a core portion containing at least 10 mol % of $GEO_2$ and having an outer diameter of 2 to 4 μm and a predetermined refractive index; and a cladding portion formed around an outer periphery of said core portion and having a refractive index set lower than that of said core portion, said cladding portion comprising:

a first cladding which is a glass region formed around the outer periphery of said core portion in close contact therewith, said first cladding containing a predetermined amount of a first impurity for reducing refractive index, having an outer diameter of 4 to 20 μm, and constituting a part of an optical cladding;

a second cladding which is a glass region formed around an outer periphery of said first cladding in close contact therewith, said second cladding having a lower glass viscosity than pure silica glass at a predetermined temperature, and constituting said optical cladding together with said first cladding; and a third cladding which is a glass region formed around an outer periphery of said second cladding in close contact therewith, said third cladding having a lower glass viscosity than pure silica glass at a predetermined temperature, and constituting a physical cladding.

13. A dispersion-compensating fiber according to claim 12, wherein the glass viscosity of said second cladding at the predetermined temperature and the glass viscosity of said third cladding at the predetermined temperature substantially coincide with each other.

14. A dispersion-compensating fiber according to claim 12, wherein said second cladding contains 0.25 wt % to 1 wt % of chlorine as said second impurity.

15. A dispersion-compensating fiber according to claim 12, wherein said first cladding contains a predetermined amount of fluorine as said first impurity.

16. A dispersion-compensating fiber according to claim 12, wherein said third cladding contains 0.1 wt % to 2 wt % of fluorine.

17. A dispersion-compensating fiber according to claim 12, wherein said third cladding contains 0.25 wt % to 1 wt % of chlorine.

18. A dispersion-compensating fiber according to claim 12, wherein said dispersion-compensating fiber has an optical transmission loss of not higher than 1 dB/km with respect to light of 1.55-μm wavelength band.

19. A dispersion-compensating fiber according to claim 12, wherein, with respect to light of 1.55-μm wavelength band, said dispersion-compensating fiber has a dispersion value of not higher than −50 ps/km/nm and a negative dispersion slope.

20. A method of fabricating a dispersion-compensating fiber according to claim 12, said method comprising the steps of:

preparing a member mainly composed of silica glass, said member comprising a core component containing at least 10 mol % of $GEO_2$, a first cladding component which is provided around said core component and contains an impurity for reducing refractive index, a second cladding component which is provided around an outer periphery of said first cladding component and has a lower glass viscosity than pure silica glass at a predetermined temperature, and a third cladding component which is provided around an outer periphery of said second cladding component and has a lower glass viscosity than pure silica glass at a predetermined temperature;

forming integrally said components so as to yield a fiber preform; and drawing said fiber preform while applying a predetermined tension thereto such that an outer diameter thereof becomes a desired diameter.

21. A method according to claim 20, wherein the drawing tension applied to said fiber preform is 5 to 16 kg/mm$^2$.

22. A method according to claim 20, wherein the glass viscosity of said second cladding component at the predetermined temperature and the glass viscosity of said third cladding component at the predetermined temperature substantially coincide with each other.

23. A method according to claim 20, wherein said second cladding component contains 0.25 wt % to 1 wt % of chlorine.

24. A method according to claim 20, wherein said first cladding component contains a predetermined amount of fluorine.

25. A method according to claim 20, wherein said third cladding component contains 0.1 wt % to 2 wt % of fluorine.

26. A method according to claim 20, wherein said third cladding component contains 0.25 wt % to 1 wt % of chlorine.

* * * * *